(12) United States Patent
Kalstrom

(10) Patent No.: US 10,638,883 B2
(45) Date of Patent: May 5, 2020

(54) COLLAPSIBLE GRILLING ASSEMBLY

(71) Applicant: Jeffrey Kalstrom, Salinas, CA (US)

(72) Inventor: Jeffrey Kalstrom, Salinas, CA (US)

( * ) Notice: Subject to any disclaimer, the term of this patent is extended or adjusted under 35 U.S.C. 154(b) by 221 days.

(21) Appl. No.: 15/878,525

(22) Filed: Jan. 24, 2018

(65) Prior Publication Data

US 2019/0223661 A1 Jul. 25, 2019

(51) Int. Cl.
*A47J 37/07* (2006.01)

(52) U.S. Cl.
CPC .... *A47J 37/0763* (2013.01); *A47J 2037/0777* (2013.01)

(58) Field of Classification Search
CPC ............... A47J 2037/0777; A47J 37/0763
USPC ..... 126/30, 9 R, 9 B, 96; 108/64, 65, 67, 99
See application file for complete search history.

(56) References Cited

U.S. PATENT DOCUMENTS

| | | | |
|---|---|---|---|
| 100,446 A * | 3/1870 | Reichenbach et al. | ......... 108/67 |
| 936,812 A * | 10/1909 | Robinson | .............. E06B 9/0661 |
| | | | 160/136 |
| 1,276,100 A * | 8/1918 | Niznik | ..................... E01F 13/12 |
| | | | 256/1 |
| 1,309,049 A | 7/1919 | Syrett | |
| 1,771,782 A * | 7/1930 | Gese | ...................... A47B 43/00 |
| | | | 108/65 |
| 3,145,766 A * | 8/1964 | Wickham | ................ E01F 13/02 |
| | | | 160/135 |
| 3,149,623 A | 9/1964 | Orr, Jr. | |
| 3,837,328 A * | 9/1974 | Schaffer | .............. A47J 37/0763 |
| | | | 126/29 |
| D243,436 S | 2/1977 | Vida | |
| 4,469,029 A * | 9/1984 | Ramond | .................. A47B 9/06 |
| | | | 108/3 |
| 4,475,528 A | 10/1984 | Kuchenbrod | |
| 6,131,560 A | 10/2000 | Healy | |
| 7,426,928 B2 | 9/2008 | Sanders et al. | |
| 8,899,536 B2 | 12/2014 | Ashpole | |
| 2008/0000400 A1* | 1/2008 | Curry | ..................... A47B 83/02 |
| | | | 108/162 |

FOREIGN PATENT DOCUMENTS

WO WO2011038334 3/2011

* cited by examiner

*Primary Examiner* — Grant Moubry
*Assistant Examiner* — Aaron H Heyamoto

(57) ABSTRACT

A collapsible grilling assembly for cooking includes a plurality of slats that is pivotally interconnected. An upper set of slats is configured to be positioned perpendicularly to a lower set in an extended configuration to define a grate. The slats are configured to be selectively and fixedly positioned in the extended configuration. Each of a plurality of legs has a first end that is configured to selectively couple to a perimeter of the grate. Each leg is configured to be extended from the grate. A second end of each leg is positioned on a surface and the grate is configured to position a heat source between the grate and the surface to heat an item that is positioned upon the grate. The slats of the upper set also are configured to position adjacently and colinearly, as are the slats of the lower set, to define a collapsed configuration.

16 Claims, 5 Drawing Sheets

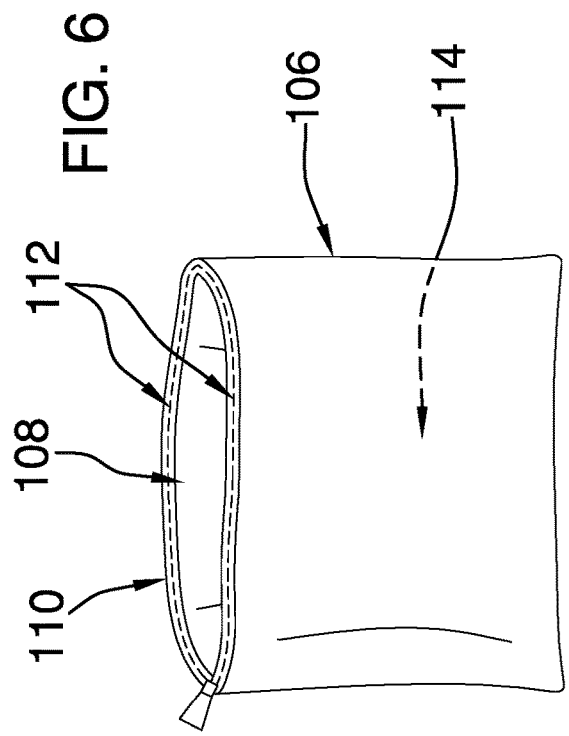
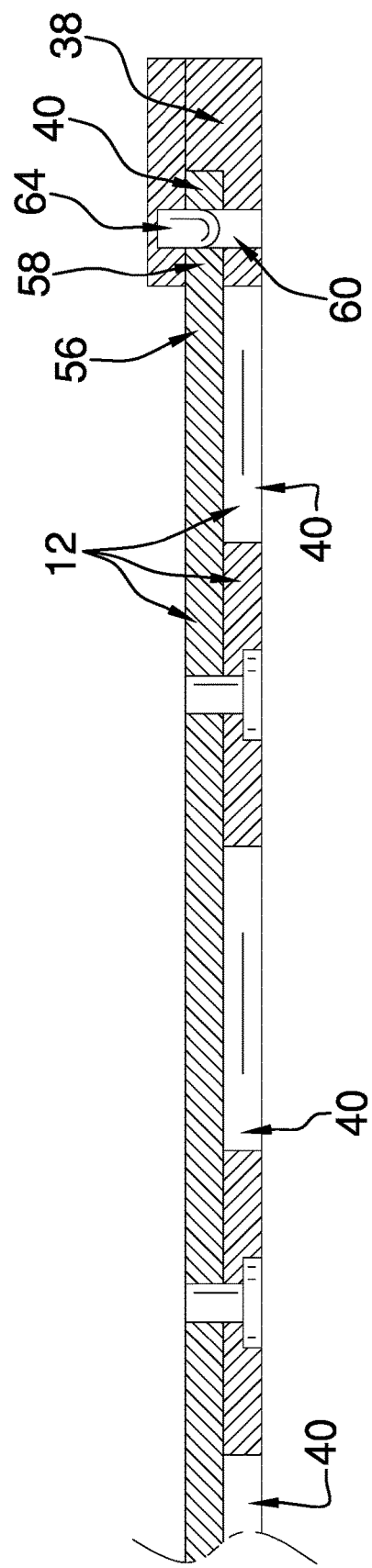

COLLAPSIBLE GRILLING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to grilling assemblies and more particularly pertains to a new grilling assembly for cooking.

BRIEF SUMMARY OF THE INVENTION

An embodiment of the disclosure meets the needs presented above by generally comprising a plurality of slats that is pivotally interconnected. An upper set of slats is configured to be positioned perpendicularly to a lower set in an extended configuration to define a grate. The slats are configured to be selectively and fixedly positioned in the extended configuration. Each of a plurality of legs has a first end that is configured to selectively couple to a perimeter of the grate. Each leg is configured to be extended from the grate. A second end of each leg is positioned on a surface and the grate is configured to position a heat source between the grate and the surface to heat an item that is positioned upon the grate. The slats of the upper set also are configured to position adjacently and colinearly, as are the slats of the lower set, to define a collapsed configuration.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 5 is a cross-sectional view of an embodiment of the disclosure.

FIG. 6 is a side view of an embodiment of the disclosure.

DETAILED DESCRIPTION OF THE INVENTION

Figure 1:
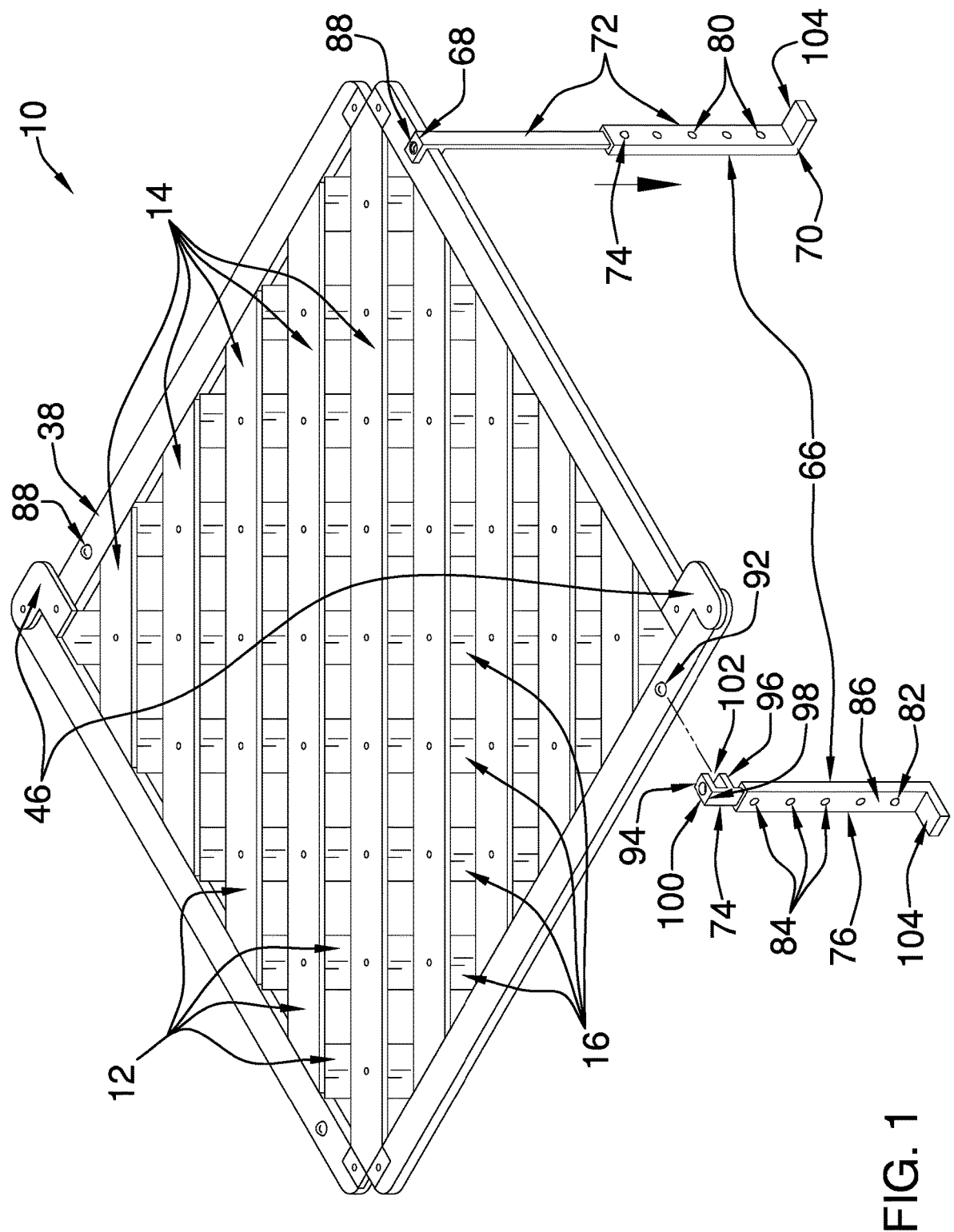
FIG. 1 is an isometric perspective view of a collapsible grilling assembly according to an embodiment of the disclosure.

With reference now to the drawings, and in particular to FIGS. 1 through 6 thereof, a new grilling assembly embodying the principles and concepts of an embodiment of the disclosure and generally designated by the reference numeral 10 will be described.

Figure 2:
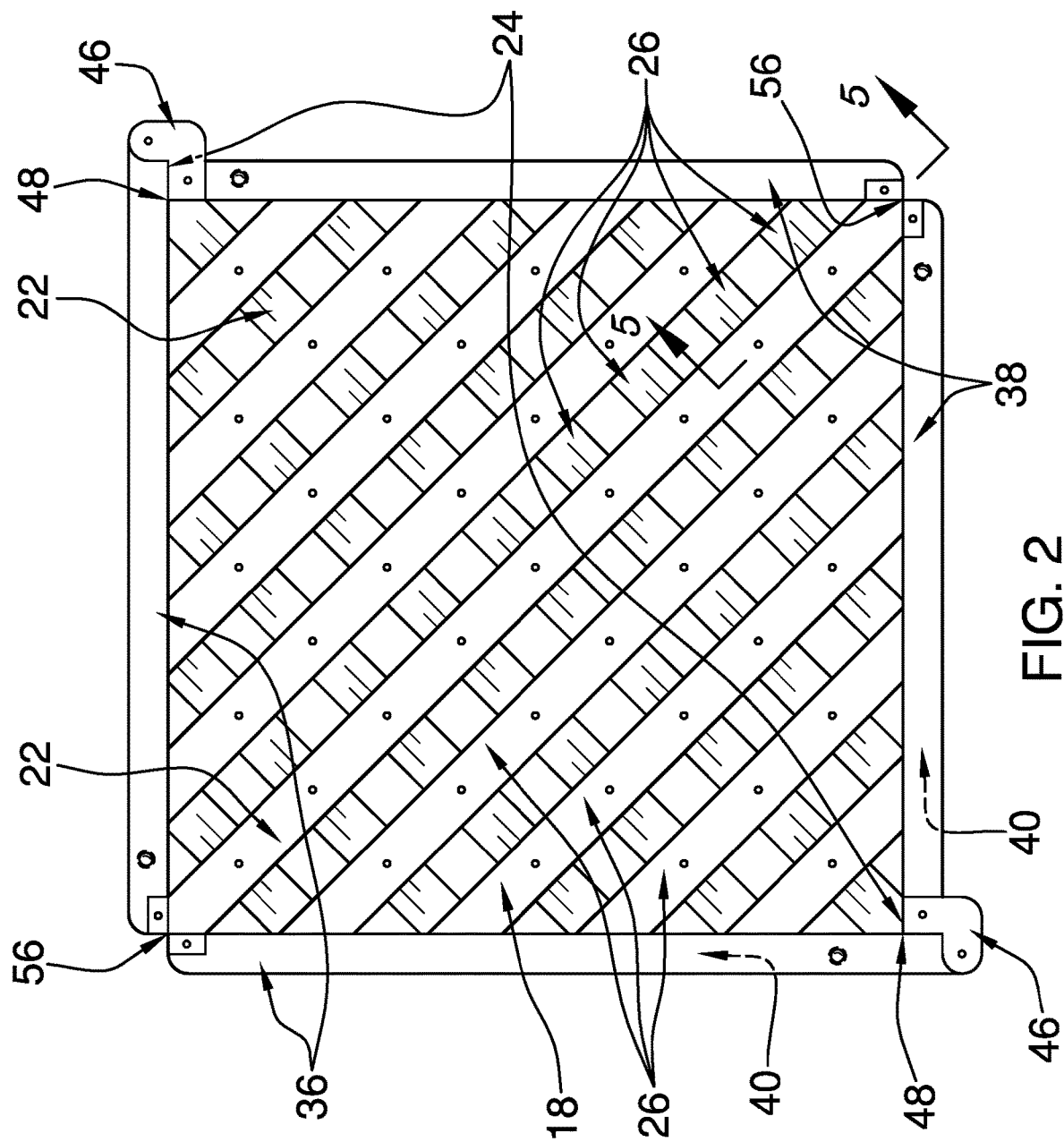
FIG. 2 is a top view of an embodiment of the disclosure.
Figure 3:
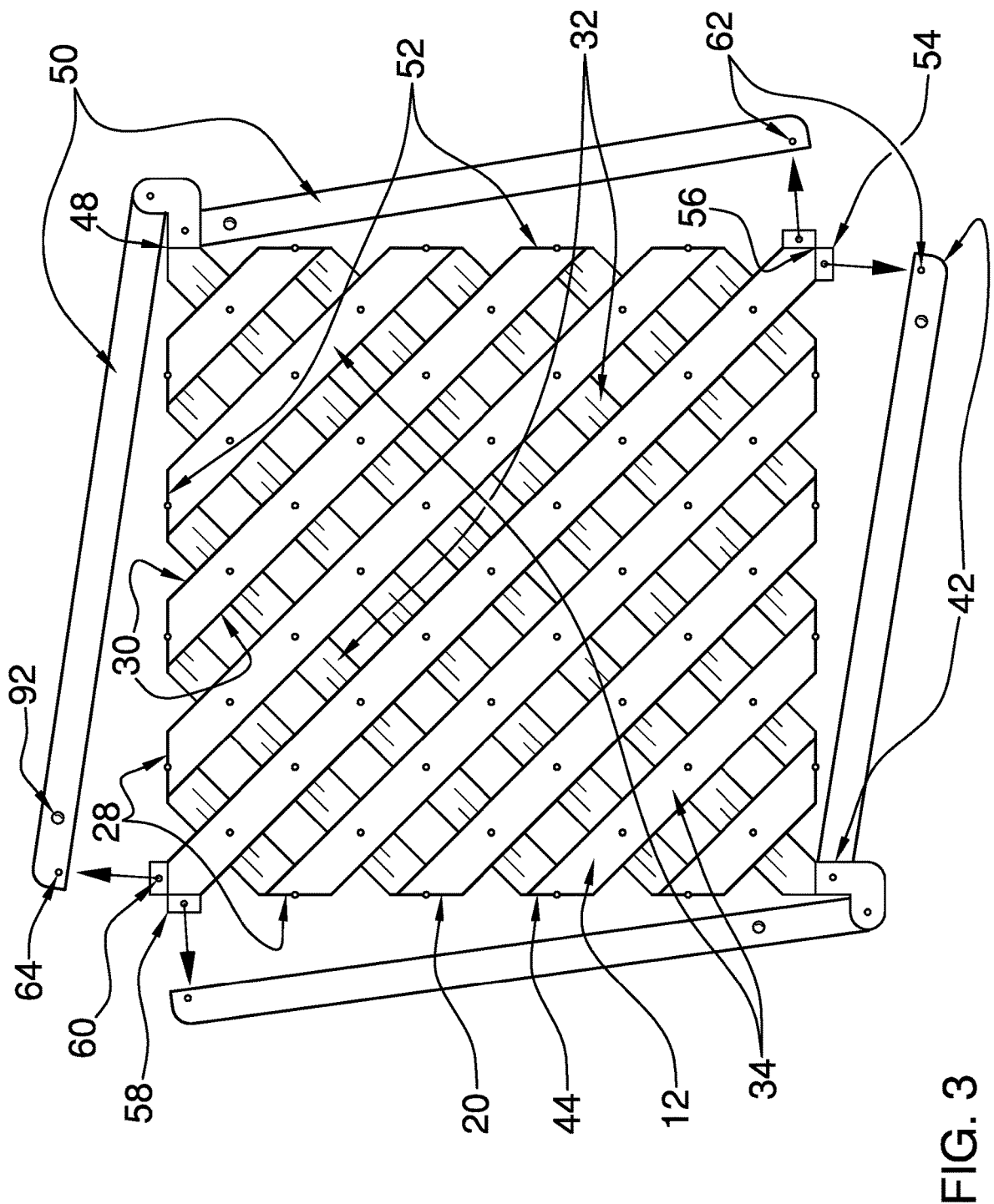
FIG. 3 is a top view of an embodiment of the disclosure.
Figure 4:
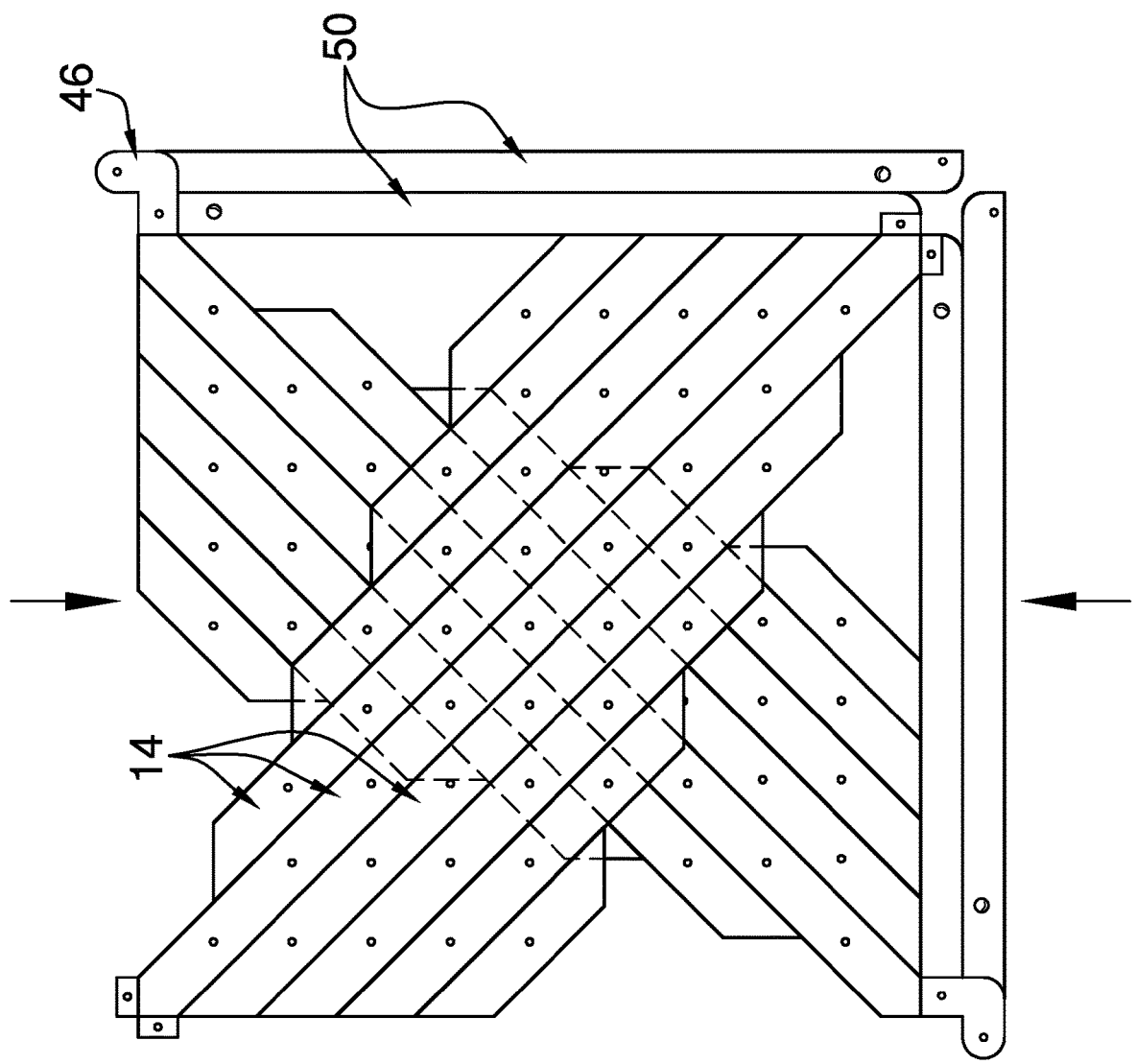
FIG. 4 is a top view of an embodiment of the disclosure.

As best illustrated in FIGS. 1 through 6, the collapsible grilling assembly 10 generally comprises a plurality of slats 12. The slats 12 are pivotally interconnected so that the slats 12 are configured to be selectively pivoted. Each slat 12 of an upper set 14 of the slats 12 is configured to be positioned perpendicularly to each slat 12 of a lower set 16 of the slats 12 in an extended configuration to define a grate 18, as shown in FIGS. 1-3. The slats 12 are configured to be selectively and fixedly positioned in the extended configuration. The slats 12 of the upper set 14 also are configured to be positioned adjacently and colinearly. The slats 12 of the lower set 16 also are configured to be positioned adjacently and colinearly. The lower set 16 is positioned adjacent and transverse to the upper set 14 to define a collapsed configuration, as shown in FIG. 4.

Each slat 12 has a respective length so that the plurality of slats 12 comprises a variety of lengths. Each slat 12 extends at forty-five degrees between a perimeter 20 of the grate 18. Each of the upper set 14 and the lower set 16 of slats 12 comprises a center slat 22 that extends between respective opposing corners 24 of the grate 18.

Each of the upper set 14 and the lower set 16 of the slats 12 also comprises a plurality of medial slats 26. Each medial slat 26 has opposing endpoints 28. Each opposing endpoint 28 is angled at forty-five degrees between opposing edges 30 of the medial slat 26. Each of a respective pair of the medial slats 32 of the lower set 16 is pivotally coupled to and extends between associated opposing endpoints 28 of an associated pair of the medial slats 34 of the upper set 14. The respective pair of the medial slats 32 of the lower set 16 and the associated pair of the medial slats 34 of the upper set 14 are rectangularly positioned within the grate 18, as presented in FIG. 3. The present invention also anticipates the variety of lengths of the plurality of slats 12 leading to grates 18 that are rectangularly, ovally, and circularly shaped.

Each of plurality of couplers 36 is configured to couple to the perimeter 20 of the grate 18 to fixedly position the slats 12 in the extended configuration. The plurality of couplers 36 comprises a plurality of bars 38 and a plurality of first slots 40. Each first slot 40 is positioned in a respective bar 38. The first slot 40 extends between opposing termini 42 of the bar 38. The first slot 40 is complementary to a respective side edge 44 of the grate 18. Each first slot 40 is positioned to selectively insertably engage the respective side edge 44 of the grate 18 to fixedly position the plurality of slats 12, as shown in FIG. 2. The first slot 40 is positioned to disengage from the perimeter 20, as shown in FIG. 3, so that the plurality of slats 12 is configured to be positioned in the collapsed configuration.

Each of a pair of brackets 46, which are L-shaped, is coupled to and extends from a respective opposing end 48 of the center slat 22 of the lower set 16. Each bracket 46 is hingedly coupled to an associated pair of bars 50. The associated pair of bars 50 is positioned to be pivoted toward the grate 18 to selectively insertably engage an adjacent pair of respective side edges 52 to fixedly position the plurality of slats 12. The associated pair of bars 50 also is positioned to be pivoted distally from the grate 18 to be disengaged from the adjacent pair of respective side edges 52 so that the plurality of slats 12 is configured to be positioned in the collapsed configuration.

Each of a plurality of first connectors 54 is coupled proximate to a respective opposing end 56 of the center slat 22 of the upper set 14. Each of a plurality of second connectors 62, which are complementary to the first connectors 54, is coupled to a respective bar 38 distal from the bracket 46 to which the respective bar 38 is coupled. Each second connector 62 is positioned to couple to an associated first connector 54 to couple the respective bar 38 to the respective side edge 44.

Each first connector 54 comprises a tab 58 and a first hole 60. The tab 58 is coupled to and extends from the respective opposing end 56 of the center slat 22 of the upper set 14. The first hole 60 is centrally positioned through the tab 58. Each second connector 62 comprises a first pin 64 that is spring-loaded.

Each of a plurality of legs 66 has a first end 68 and a second end 70. The first end 68 is configured to selectively be coupled to the perimeter 20 of the grate 18. Each leg 66 is configured to be extended from the grate 18 so that a second end 70 of the leg 66 is positioned on a surface. The grate 18 is configured to position a heat source between the grate 18 and the surface to heat an item that is positioned upon the grate 18.

Each leg 66 is configured to couple to a respective bar 38. Each leg 66 comprises a plurality of nested sections 72 so that the leg 66 is selectively extensible. Each leg 66 is configured to be selectively extended between the grate 18 and an uneven surface so that the grate 18 is positioned horizontally.

The plurality of nested sections 72 comprises a rod 74 and a tube 76. The rod 74 is selectively extensible from the tube 76. The rod 74 and the tube 76 are rectangularly shaped when viewed longitudinally. Each of a plurality of first fasteners 78 is coupled to a respective rod 74. Each of a plurality of second fasteners 80 is coupled to a respective tube 76. The second fasteners 80 are complementary to the first fasteners 78. Each second fastener 80 is positioned to selectively couple to a respective first fastener 78 to fixedly couple the respective rod 74 to the respective tube 76.

Each first fastener 78 comprises a second pin 82 that is spring-loaded. Each second fastener 80 comprises a plurality of second holes 84 that is positioned through a wall 86 of the respective tube 76. The second pin 82 is positioned to be selectively inserted into a respective second hole 84 to fixedly couple the respective rod 74 to the respective tube 76.

Each of a plurality of third connectors 88 is coupled to a respective bar 38 proximate to the bracket 46. Each of a plurality of fourth connectors 90 is coupled to a respective rod 74. The fourth connectors 90 are complementary to the third connectors 88. Each fourth connector 90 is positioned to couple to a respective third connector 88 to couple an associated leg 66 to the respective bar 38.

Each third connector 88 comprises a bearing 92. The bearing 92 is spring-loaded ball type. Each fourth connector 90 comprises a first plate 94 and a second plate 96. The first plate 94 is coupled to and extends from a terminus 98 of the rod 74. An orifice 100 is positioned through the first plate 94. The orifice 100 is complementary to the bearing 92. The second plate 96 is coupled to and extends from the rod 74 proximate to the first plate 94. The second plate 96 extends codirectionally and parallelly with the first plate 94 to define a second slot 102. The second slot 102 is positioned to insert the respective bar 38 to position an associated bearing 92 to insert into the orifice 100 to couple the leg 66 to the respective bar 38.

Each of a plurality of feet 104 is coupled to the second end 70 of a respective leg 66. Each foot 104 is positioned to stabilize the respective leg 66 on the surface.

The assembly 10 also comprises a shell 106 that defines an interior space 114, shown in FIG. 6. The shell 106 has a top 108 that is open. The shell 106 is configured to insert the plurality of slats 12 in the collapsed configuration, as well as the plurality of legs 66. A closure 110 is coupled to the shell 106 proximate to the top 108. The closure 110 is configured to selectively couple to the shell 106 to close the top 108. The closure 110 comprises a zipper 112 or the like.

In use, each slat 12 of the upper set 14 of the slats 12 is configured to be positioned perpendicularly to each slat 12 of the lower set 16 of the slats 12. The associated pair of bars 50 is positioned to be pivoted toward the grate 18 to selectively insertably engage the adjacent pair of respective side edges 52 to fixedly position the plurality of slats 12. Each fourth connector 90 is positioned to couple to a respective third connector 88 to couple an associated leg 66 to the respective bar. The grate 18 is configured to position the heat source between the grate 18 and the surface to heat the item that is positioned upon the grate 18. The associated pair of bars 50 is positioned to be pivoted distally from the grate 18 to be disengaged from the adjacent pair of respective side edges 52. The slats 12 of the upper set 14 are configured to be positioned adjacently and colinearly. The slats 12 of the lower set 16 are configured to be positioned adjacently and colinearly. The lower set 16 is positioned adjacent and transverse to the upper set 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A collapsible grilling assembly comprising:
a plurality of slats, said slats being pivotally interconnected such that said slats are configured for selectively pivoting, wherein each said slat of an upper set of said slats is configured for positioning perpendicularly to each of a lower set of said slats in an extended configuration for defining a grate, wherein said slats of said upper set are configured for positioning adjacently and colinearly, wherein said slats of said lower set configured for positioning adjacently and colinearly, wherein said lower set is positioned adjacent and transverse to said upper set defining a collapsed configuration, said slats being configured for selectively fixedly positioning in the extended configuration;
a plurality of legs, each said leg having a first end and a second end, said first end being configured for selectively coupling to a perimeter of said grate; and
wherein said plurality of legs is configured for coupling to said grate such that each said leg is configured for extending from said grate positioning a second end of said leg on a surface such that said grate is configured for positioning a heat source between said grate and the surface for heating an item positioned upon said grate;
each said slat having a respective length such that said plurality of slats comprises a variety of lengths;
each said slat extending at forty-five degrees between said perimeter of said grate;
each of said upper set and said lower set comprising a center slat extending between respective opposing corners of said grate;
each of said upper set and said lower set comprising a plurality of medial slats, each said medial slat having opposing endpoints, each said opposing endpoint being angled at forty-five degrees between opposing edges of said medial slat; and
pairs of said medial slats of said lower set not including said center slat of said lower slats being pivotally coupled to and extending between associated said opposing endpoints of an associated pair of said medial slats of said upper set such that said respective pair of said medial slats of said lower set and said associated pair of said medial slats of said upper set are rectangularly positioned within said grate;
a plurality of couplers, said couplers being configured for coupling to said perimeter of said grate for fixedly positioning said slats in the extended configuration; and
said plurality of couplers comprising
a plurality of bars,
a plurality of first slots, each said first slot being positioned in a respective said bar, each said first slot extending between opposing termini of said bar, said first slot being complementary to a respective side edge of said grate,
wherein said first slots are positioned in said bars such that each said first slot is positioned for selectively insertably engaging said respective said side edge of said grate for fixedly positioning said plurality of slats and for disengaging from said perimeter such that said plurality of slats is configured for positioning in the collapsed configuration,
a pair of brackets, said brackets being L-shaped, each said bracket being coupled to and extending from a respective opposing end of said center slat of said lower set, each said bracket being hingedly coupled to an associated pair of said bars, and
wherein said associated pair of bars is positioned on said bracket such that said associated said pair of bars is positioned for pivoting toward said grate for selectively insertably engaging an adjacent pair of said respective said side edges for fixedly positioning said plurality of slats, wherein said associated pair of bars is positioned for pivoting distally from said grate for disengaging from said adjacent pair of said respective said side edges such that said plurality of slats is configured for positioning in the collapsed configuration.

2. The assembly of claim 1, further comprising:
a plurality of first connectors, each said first connector being coupled proximate to a respective opposing end of said center slat of said upper set;
a plurality of second connectors, said second connectors being complementary to said first connectors, each said second connector being coupled to a respective said bar distal from said bracket to which said respective said bar is coupled; and
wherein said second connectors are positioned on said bars such that each said second connector is positioned for coupling to an associated said first connector for coupling said respective said bar to said respective said side edge.

3. The assembly of claim 2, further comprising:
each said first connector comprising a tab and a first hole, said tab being coupled to and extending from said respective opposing end of said center slat of said upper set, said first hole being centrally positioned through said tab; and
each said second connector comprising a first pin, said first pin being spring-loaded.

4. The assembly of claim 1, further including each said leg being configured for coupling to a respective said bar.

5. The assembly of claim 4, further including each said leg comprising a plurality of nested sections such that said leg is selectively extensible, wherein said legs are positioned on said grate such that each said leg is configured for selectively extending between said grate and an uneven surface such that said grate is positioned horizontally.

6. The assembly of claim 5, further including said plurality of nested sections comprising a rod and a tube, said rod being selectively extensible from said tube.

7. The assembly of claim 6, further including said rod and said tube being rectangularly shaped when viewed longitudinally.

8. The assembly of claim 6, further comprising:
a plurality of first fasteners, each said first fastener being coupled to a respective said rod;
a plurality of second fasteners, each said second fastener being coupled to a respective said tube, said second fasteners being complementary to said first fasteners; and
wherein said second fasteners are positioned on said tubes such that each said second fastener is positioned for selectively coupling to a respective said first fastener for fixedly coupling said respective said rod to said respective said tube.

9. The assembly of claim 8, further comprising:
each said first fastener comprising a second pin, said second pin being spring-loaded; and
each said second fastener comprising a plurality of second holes positioned through a wall of said respective said tube.

10. The assembly of claim 6, further comprising:
a plurality of third connectors, each said third connector being coupled to a respective said bar proximate to said bracket;
a plurality of fourth connectors, each said fourth connector being coupled to a respective said rod, said fourth connectors being complementary to said third connectors; and
wherein said fourth connectors are positioned on said rods such that each said fourth connector is positioned for coupling to a respective said third connector for coupling an associated said leg to said respective said bar.

11. A collapsible grilling assembly comprising:
a plurality of slats, said slats being pivotally interconnected such that said slats are configured for selectively pivoting, wherein each said slat of an upper set of said slats is configured for positioning perpendicularly to each of a lower set of said slats in an extended configuration for defining a grate, wherein said slats of said upper set are configured for positioning adjacently and colinearly, wherein said slats of said lower set configured for positioning adjacently and colinearly, wherein said lower set is positioned adjacent and transverse to said upper set defining a collapsed configuration, said slats being configured for selectively fixedly positioning in the extended configuration;
a plurality of legs, each said leg having a first end and a second end, said first end being configured for selectively coupling to a perimeter of said grate, each said leg being configured for coupling to a respective one of a plurality of bars, each said leg comprising a plurality of nested sections such that said leg is selectively extensible, wherein said legs are positioned on said grate such that each said leg is configured for selectively extending between said grate and an uneven surface such that said grate is positioned horizontally, said plurality of nested sections comprising a rod and a tube, said rod being selectively extensible from said tube;
wherein said plurality of legs is configured for coupling to said grate such that each said leg is configured for extending from said grate positioning a second end of said leg on a surface such that said grate is configured for positioning a heat source between said grate and the surface for heating an item positioned upon said grate;
a plurality of third connectors, each said third connector being coupled to a respective said bar proximate to said bracket;
a plurality of fourth connectors, each said fourth connector being coupled to a respective said rod, said fourth connectors being complementary to said third connectors;
wherein said fourth connectors are positioned on said rods such that each said fourth connector is positioned for coupling to a respective said third connector for coupling an associated said leg to said respective said bar;
each said third connector comprising a bearing, said bearing being spring-loaded ball type;

each said fourth connector comprising:
a first plate coupled to and extending from a terminus of said rod,
an orifice positioned through said first plate, said orifice being complementary to said bearing, and
a second plate coupled to and extending from said rod proximate to said first plate, said second plate extending codirectionally and parallelly with said first plate defining a second slot; and
wherein said second slot is positioned on said rod such that said second slot is positioned for inserting said respective said bar positioning an associated said bearing for inserting into said orifice for coupling said leg to said respective said bar.

12. The assembly of claim 1, further including a plurality of feet, each said foot being coupled to said second end of a respective said leg, wherein said feet are positioned on said legs such that each said foot is positioned for stabilizing said respective said leg on the surface.

13. The assembly of claim 1, further including a shell defining an interior space, said shell having a top, said top being open such that said shell is configured for inserting said plurality of slats in the collapsed configuration and said plurality of legs.

14. The assembly of claim 13, further including a closure coupled to said shell proximate to said top, said closure being configured for selectively coupling to said shell for closing said top.

15. The assembly of claim 14, further including said closure comprising a zipper.

16. A collapsible grilling assembly comprising:
a plurality of slats, said slats being pivotally interconnected such that said slats are configured for selectively pivoting, wherein each said slat of an upper set of said slats is configured for positioning perpendicularly to each of a lower set of said slats in an extended configuration for defining a grate, wherein said slats of said upper set are configured for positioning adjacently and colinearly, wherein said slats of said lower set configured for positioning adjacently and colinearly, wherein said lower set is positioned adjacent and transverse to said upper set defining a collapsed configuration, said slats being configured for selectively fixedly positioning in the extended configuration, each said slat having a respective length such that said plurality of slats comprises a variety of lengths, each said slat extending at forty-five degrees between a perimeter of said grate, each of said upper set and said lower set comprising a center slat extending between respective opposing corners of said grate, each of said upper set and said lower set comprising a plurality of medial slats, each said medial slat having opposing endpoints, each said opposing endpoint being angled at forty-five degrees between opposing edges of said medial slat, pairs of said medial slats of said lower set not including said center slat of said lower slats being pivotally coupled to and extending between associated said opposing endpoints of an associated pair of said medial slats of said upper set such that said respective pair of said medial slats of said lower set and said associated pair of said medial slats of said upper set are rectangularly positioned within said grate;
a plurality of couplers, said couplers being configured for coupling to said perimeter of said grate for fixedly positioning said slats in the extended configuration, said plurality of couplers comprising:
a plurality of bars, and a plurality of first slots, each said first slot being positioned in a respective said bar, each said first slot extending between opposing termini of said bar, said first slot being complementary to a respective side edge of said grate, wherein said first slots are positioned in said bars such that each said first slot is positioned for selectively insertably engaging said respective said side edge of said grate for fixedly positioning said plurality of slats and for disengaging from said perimeter such that said plurality of slats is configured for positioning in the collapsed configuration, a pair of brackets, said brackets being L-shaped, each said bracket being coupled to and extending from a respective opposing end of said center slat of said lower set, each said bracket being hingedly coupled to an associated pair of said bars, wherein said associated pair of bars is positioned on said bracket such that said associated said pair of bars is positioned for pivoting toward said grate for selectively insertably engaging an adjacent pair of said respective said side edges for fixedly positioning said plurality of slats, wherein said associated pair of bars is positioned for pivoting distally from said grate for disengaging from said adjacent pair of said respective said side edges such that said plurality of slats is configured for positioning in the collapsed configuration;

a plurality of first connectors, each said first connector being coupled proximate to a respective opposing end of said center slat of said upper set, each said first connector comprising a tab and a first hole, said tab being coupled to and extending from said respective opposing end of said center slat of said upper set, said first hole being centrally positioned through said tab;

a plurality of second connectors, said second connectors being complementary to said first connectors, each said second connector being coupled to a respective said bar distal from said bracket to which said respective said bar is coupled, wherein said second connectors are positioned on said bars such that each said second connector is positioned for coupling to an associated said first connector for coupling said respective said bar to said respective said side edge, each said second connector comprising a first pin, said first pin being spring-loaded;

a plurality of legs, each said leg having a first end and a second end, said first end being configured for selectively coupling to said perimeter of said grate, wherein said plurality of legs is configured for coupling to said grate such that each said leg is configured for extending from said grate positioning a second end of said leg on a surface such that said grate is configured for positioning a heat source between said grate and the surface for heating an item positioned upon said grate, each said leg being configured for coupling to a respective said bar, each said leg comprising a plurality of nested sections such that said leg is selectively extensible, wherein said legs are positioned on said grate such that each said leg is configured for selectively extending between said grate and an uneven surface such that said grate is positioned horizontally, said plurality of nested sections comprising a rod and a tube, said rod being selectively extensible from said tube, said rod and said tube being rectangularly shaped when viewed longitudinally;

a plurality of first fasteners, each said first fastener being coupled to a respective said rod, each said first fastener comprising a second pin, said second pin being spring-loaded;

a plurality of second fasteners, each said second fastener being coupled to a respective said tube, said second fasteners being complementary to said first fasteners, wherein said second fasteners are positioned on said tubes such that each said second fastener is positioned for selectively coupling to a respective said first fastener for fixedly coupling said respective said rod to said respective said tube, each said second fastener comprising a plurality of second holes positioned through a wall of said respective said tube;

a plurality of third connectors, each said third connector being coupled to a respective said bar proximate to said bracket, each said third connector comprising a bearing, said bearing being spring-loaded ball type;

a plurality of fourth connectors, each said fourth connector being coupled to a respective said rod, said fourth connectors being complementary to said third connectors, wherein said fourth connectors are positioned on said rods such that each said fourth connector is positioned for coupling to a respective said third connector for coupling an associated said leg to said respective said bar, each said fourth connector comprising:
  a first plate coupled to and extending from a terminus of said rod,
  an orifice positioned through said first plate, said orifice being complementary to said bearing, and
  a second plate coupled to and extending from said rod proximate to said first plate, said second plate extending codirectionally and parallelly with said first plate defining a second slot, wherein said second slot is positioned on said rod such that said second slot is positioned for inserting said respective said bar positioning an associated said bearing for inserting into said orifice for coupling said leg to said respective said bar;

a plurality of feet, each said foot being coupled to said second end of a respective said leg, wherein said feet are positioned on said legs such that each said foot is positioned for stabilizing said respective said leg on the surface;

a shell defining an interior space, said shell having a top, said top being open such that said shell is configured for inserting said plurality of slats in the collapsed configuration and said plurality of legs;

a closure coupled to said shell proximate to said top, said closure being configured for selectively coupling to said shell for closing said top, said closure comprising a zipper; and wherein each said slat of said upper set of said slats is configured for positioning perpendicularly to each said slat of said lower set of said slats, wherein said associated pair of bars is positioned on said bracket such that each of said associated said pair of bars is positioned for pivoting toward said grate for selectively insertably engaging said adjacent pair of said respective said side edges for fixedly positioning said plurality of slats, wherein said fourth connectors are positioned on said rods such that each said fourth connector is positioned for coupling to a respective said third connector for coupling an associated said leg to said respective said bar, such that said grate is configured for positioning the heat source between said grate and the surface for heating the item positioned upon said grate, wherein said associated pair of bars is positioned for pivoting distally from said grate for disengaging from said adjacent pair of said respective said side edges such that said slats of said upper set are configured for positioning adjacently and colinearly, wherein said slats of said lower set configured for positioning adjacently and colinearly, wherein said lower set is positioned adjacent and transverse to said upper set.

* * * * *